US008731350B1

(12) United States Patent
Lin et al.

(10) Patent No.: US 8,731,350 B1
(45) Date of Patent: May 20, 2014

(54) PLANAR-WAVEGUIDE BRAGG GRATINGS IN CURVED WAVEGUIDES

(75) Inventors: Chunyan Lin, San Diego, CA (US); Everett W. Jacobs, San Diego, CA (US); James R. Adleman, San Diego, CA (US); John Scott Rodgers, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 56 days.

(21) Appl. No.: 13/609,294

(22) Filed: Sep. 11, 2012

(51) Int. Cl.
*G02B 6/34* (2006.01)
*G02B 6/10* (2006.01)
*G02F 1/295* (2006.01)

(52) U.S. Cl.
USPC .......................... 385/37; 385/129; 359/337.21

(58) Field of Classification Search
USPC .............. 385/34–39.147, 10, 129; 359/341.1, 359/346, 337, 885, 337.21
See application file for complete search history.

(56) References Cited

U.S. PATENT DOCUMENTS

| | | | | |
|---|---|---|---|---|
| 4,743,083 | A * | 5/1988 | Schimpe | 385/37 |
| 5,784,509 | A * | 7/1998 | Yamane et al. | 385/49 |
| 6,577,792 | B2 | 6/2003 | Brennen | |
| 6,731,839 | B2 * | 5/2004 | Bhagavatula et al. | 385/37 |
| 7,008,551 | B2 | 3/2006 | Sun | |
| 7,260,290 | B1 * | 8/2007 | Greiner et al. | 385/37 |
| 7,535,934 | B2 * | 5/2009 | Nicholson et al. | 372/6 |
| 8,135,245 | B2 * | 3/2012 | Rodriguez Erdmenger et al. | 385/12 |
| 8,270,789 | B2 * | 9/2012 | Ogawa et al. | 385/37 |
| 2002/0191912 | A1 * | 12/2002 | Robinson et al. | 385/37 |
| 2003/0072532 | A1 * | 4/2003 | Giannone et al. | 385/37 |

OTHER PUBLICATIONS

C.Lin, E.W.Jacobs, and J.S.Rodgers, "Spiral Planar-waveguide Bragg Gratings", Proc. of SPIE vol. 7218, 72180E 2009.
Min-su Kim, Jung Jin Ju, Seung Koo Pak, Myung-Hyun Lee, Sang Hoon Kim, and Ki-Dong Lee, "Tailoring Chirp Characteristics of Waveguide Bragg Gratings using Tapered Core Profiles", IEEE Photonics Technology Letters, vol. 18, No. 22, Nov. 15, 2006.
Alexandre D. Simard, Yves Painchaud, Sophie LaRochelle, "Integrated Bragg Gratings in Curved Waveguides", IEEE Photonics Society, 2010 23rd Annual Meeting, p. 726-727.
K. Hill, G. Meltz, "Fiber Bragg Grating Technology Fundamentals and Overview", Journal of Lightwave technology, vol. 15, No. 8, Aug. 1997.

(Continued)

*Primary Examiner* — Akm Enayet Ullah
(74) *Attorney, Agent, or Firm* — SPAWAR Systems Center Pacific; Kyle Eppele; Stephen E. Baldwin

(57) ABSTRACT

A method for forming planar-waveguide Bragg grating in a curved waveguide comprises: forming a long chirped planar-waveguide Bragg grating in an Archimedes' spiral such that a long length of the waveguide can fit in a small chip area where the grating is formed in the curved waveguide; using periodic width modulation to form the planar-waveguide Bragg grating on the curved waveguide, and where the formation of the periodic width modulation occurs during the etching of the waveguide core; using rectangular width modulation to create Bragg gratings with a higher order than $1^{st}$ order to allow a larger grating period and larger modulation depth, using waveguide width tapering while keeping the width modulation period constant to introduce chirp to the planar-waveguide Bragg grating where the index of refraction is a function of waveguide width, by applying a specific width tapering to create a desired arbitrary chirp profile.

6 Claims, 4 Drawing Sheets

(56) References Cited

OTHER PUBLICATIONS

R. Fabian Pease, and S. Y. Chou, "Lithography and Other patterning Techniques for Future Electronics", Proceedings of the IEEE, vol. 96, No. 2, Feb. 2008.

Proximion Fiber Systems AB, Dispersion Compensation Module DCM-FB, Doc No. I006I0-J (2006).

J. R. Adleman, C.L.Lin, B.M.L.Pascoguin, B.Neuner III, A. Hening, M. Lasher, E.W. Jacobs, and J.S. Rodgers, "Two-layer Integrated Optical Tapped Delay Line for RF Spectrum Analysis", IEEE Photonics Conference, 2012.

Bauters, Jared F; Heck, Martijn J R; John, Demis D; Barton, Jonathon S; Bruinink, Christiaan M; Leinse, Arne; Heideman, René G; Blumenthal, Daniel J; Bowers, John E, "Planar waveguides with less than 0.1 dB/m propagation loss fabricated with wafer bonding," Optics Express, vol. 19 Issue 24, pp. 24090-24101 (2011), Nov. 10, (2011).

Heiblum, M. and Harris, J., "Analysis of Curved Optical Waveguides by Conformal Transformation", IEEE Journal of Quantum Electronics, vol. QE-11, No. 2, pp. 75-83, Feb. 1979.

\* cited by examiner

PLANAR-WAVEGUIDE BRAGG GRATINGS IN CURVED WAVEGUIDES

FEDERALLY-SPONSORED RESEARCH AND DEVELOPMENT

This invention (Navy Case No. 101,402) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

BACKGROUND OF THE INVENTION

This invention disclosure describes a method for realizing a long chirped planar-waveguide Bragg grating with Archemedes' spiral geometry that can fit in a small area (~1 m can be realized in an area of 1 cm$^2$) and provide large dispersion. The ability to form the grating in such a small area enables fabrication with only a single photolithography mask. Therefore the large physical translation associated with long CFBG fabrication methods is avoided, and the associated specialized fabrication equipment is replaced by standard photolithography equipment. Utilizing photolithography fabrication techniques enables fabrication of planar-waveguide Bragg gratings with custom dispersion profiles for different applications.

Two common dispersive devices are Chirped Fiber Bragg Gratings (CFBG) and Dispersion Compensation Fiber (DCF). The formation of gratings in optical fiber is commonly done by UV exposure to the core of the fiber to produce a periodic index modulation. A conventional way to fabricate long CFBG is by stitching together smaller grating segments. A small length of fiber grating is written with a UV interferogram, a translation stage moves the fiber and the next segment is written. This process continues until the whole grating is formed. In order to properly align and stitch together the segments, the precise location of the fiber must be known. The accuracy of the fiber location is limited by the motion stage encoder moving the fiber. Extremely precise tolerances in the mechanical and optical systems must be maintained in order to properly form the complete grating. This has led to the development of specialized precision equipment for fabrication of long gratings. Current CFBG technology can deliver 10 m long 2.5 ns/nm group velocity dispersion over entire optical C band (40 nm) with <4 dB insertion loss.

DCF has dispersion of −100 ps/nm/km with insertion loss of 0.6 dB/km. In order to achieve a large dispersion, a long length of DCF is required. Having a long length of DCF in a system not only increases the overall system size, but also introduces extra insertion loss. For example, 25 km of DCF fiber is required to achieve 2.5 ns/nm dispersion, and introduces 15 dB insertion loss.

This concept is motivated by recent advances in the development of low optical propagation loss planar-waveguides. Integrated photonic device fabricated in silica planar-waveguides has been demonstrated with <2 dB/m propagation loss, where the waveguide material platform design was 15 μm silica under cladding, 4 μm silica core with 1.5% index contrast, 22 μm silica top cladding, on a silicon substrate. Extra-low-loss planar-waveguides has been demonstrated (<0.1 dB/m), where the waveguides are fabricated on a silicon substrate with 15 μm of silica lower cladding, $Si_3N_4$ core, and 15 μm silica top cladding.

SUMMARY OF THE INVENTION

In one embodiment, a method for forming planar-waveguide Bragg grating in a curved waveguide comprises: forming a long chirped planar-waveguide Bragg grating in an Archimedes' spiral such that a long length of the waveguide can fit in a small chip area for single mask photolithography fabrication where the grating is formed in the curved waveguide; using periodic width modulation to form the planar-waveguide Bragg grating on the curved with modulation periods equal to $R_{in}\Lambda/(R_{in}+W/2)$ and $R_{out}\Lambda/(R_{out}-W/2)$ for the inner and outer edge of the curve waveguide, where $R_{in}$ and $R_{out}$ are the inner and outer radius, $\Lambda$ is modulation period for Bragg condition, and W is the width of the waveguide and where the formation of the periodic width modulation occurs during the etching of the waveguide core; using rectangular width modulation to create Bragg gratings with a higher order than $1^{st}$ order to allow a larger grating period and larger modulation depth, and therefore relax fabrication requirements; and using waveguide width tapering while keeping the width modulation period constant to introduce chirp to the planar-waveguide Bragg grating where the index of refraction is a function of waveguide width, by applying a specific width tapering such that desired arbitrary chirp profile can be created for the planar-waveguide Bragg grating.

BRIEF DESCRIPTION OF THE DRAWINGS

The features of the present invention will be best understood from the accompanying drawings, taken in conjunction with the accompanying description, in which similarly-referenced characters refer to similarly-referenced components, and in which.

DETAILED DESCRIPTION OF THE EMBODIMENTS

The present invention is a long chirped planar-waveguide Bragg grating with high dispersion that could be used for a variety of applications such as routing, filtering, dispersion compensation and optical time-stretch processing. The present invention provides planar-waveguide Bragg gratings that can provide customized dispersion properties for various applications.

It is important for signal processing applications to have large dispersion (long grating) and low optical loss gratings. With the present invention, the long chirped planar-waveguide Bragg grating with Archimedes' spiral geometry can be fit in a small area (for example, ~1 m can be realized in an area of 1 cm$^2$). The ability to form the grating in such a small area enables the use of a single photolithography mask. Therefore the large physical translation associated with long CFBG fabrication methods is avoided, and the associated specialized fabrication equipment is replaced by standard photolithography equipment. This approach removes the stitching error associated with the mechanical translation required in existing approaches. By utilizing photolithography fabrication techniques, planar-waveguide Bragg gratings can be fabricated with custom dispersion parameters for different applications.

The inventive device described herein, in the most general embodiment, is a compact integrated waveguide device (e.g., long chirped planar-waveguide Bragg gratings) to provide custom dispersion parameter for various applications, e.g., dispersion compensation and other optical signal processing applications. In one embodiment, the present invention provides the combination of four design methods for planar-waveguide Bragg gratings such that utilizing standard low cost semiconductor photolithography technique for fabrication is possible.

Figure 1:
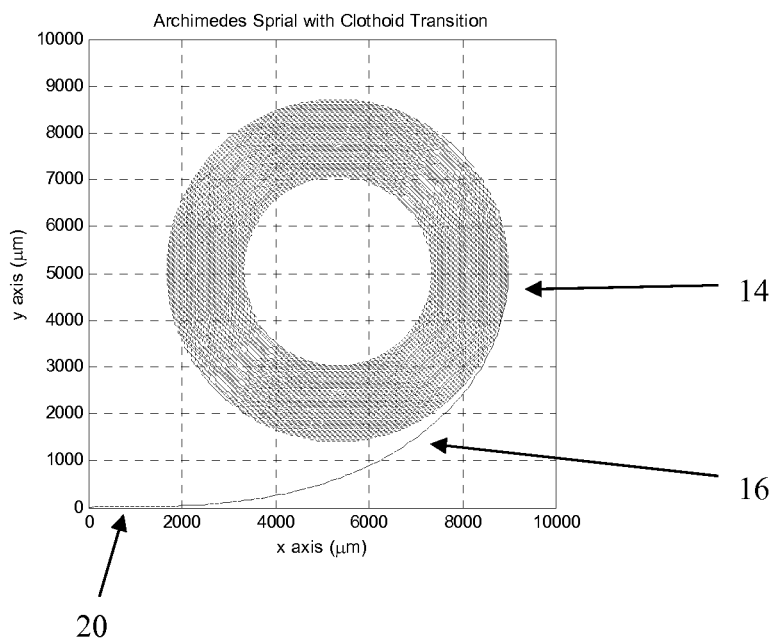
FIG. 1 is a schematic showing a 1 m long planar-waveguide Bragg gratings that fits in a 1 cm$^2$ chip area with Archimedes' spiral geometry design.

The following design methods will now be described in conjunction with FIGS. 1-8, in which:

FIG. 1 is a schematic showing a 1 m long planar-waveguide Bragg grating that fits in a 1 cm$^2$ chip area with Archimedes' spiral geometry design 14. In order to minimize coupling loss from the straight waveguide segment to the spiral, a Clothoid function transition curved waveguide 16 is used between the straight waveguide 20 and the Archimedes' spiral 14.

Figure 2:
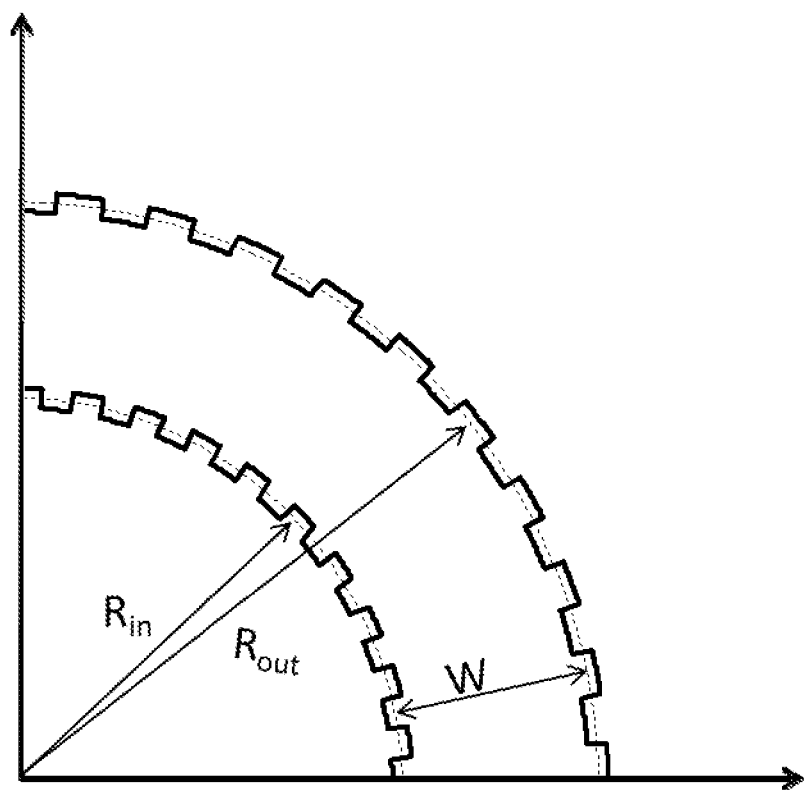
FIG. 2 is a schematic showing a short segment of curved waveguide with periodic rectangular width modulation for higher order planar-waveguide Bragg gratings.

FIG. 2 schematically shows a short segment of curved waveguide with periodic rectangular width modulation planar-waveguide Bragg gratings where the modulation period is $R_{in}\Lambda/(R_{in}+W/2)$ and $R_{out}\Lambda/(R_{out}-W/2)$ for the inner and outer edge of the curve waveguide, where $R_{in}$ and $R_{out}$ are the inner and outer radius, $\Lambda$ is modulation period for Bragg condition, and W is the width of the waveguide.

Figure 3:
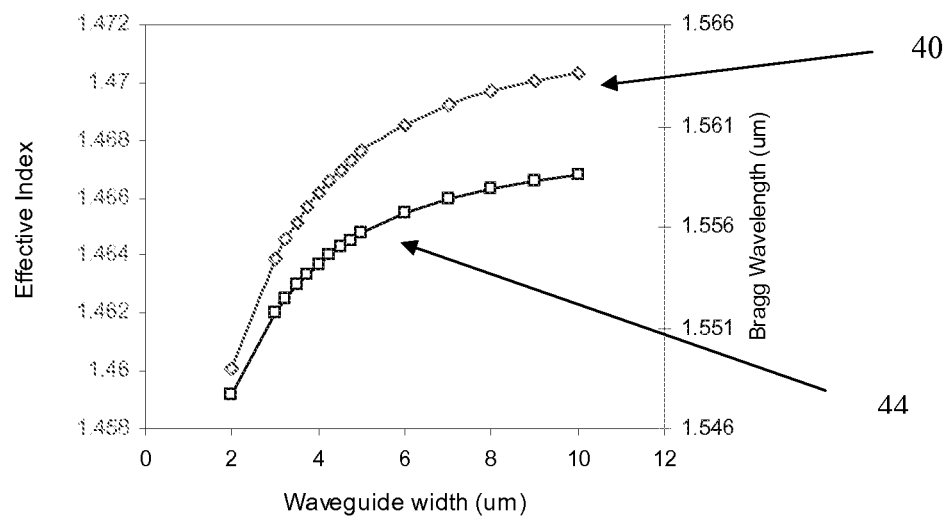
FIG. 3 is a plot of effective index and Bragg wavelength versus waveguide width.

FIG. 3 is a plot of effective index versus waveguide width 40 of a 4 um height 1.5% index contrast silica waveguide, and Bragg wavelength as a function of waveguide width 44 for this silica waveguide.

Figure 4:
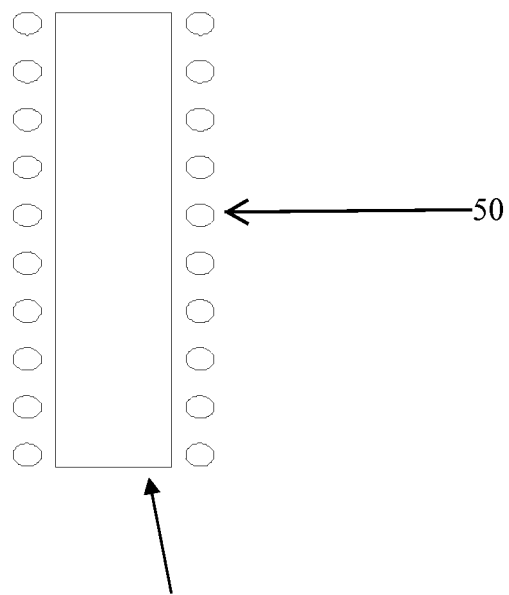
FIG. 4 is a picture showing the cladding modulation concept for planar-waveguide Bragg gratings.

FIG. 4 is a picture showing the cladding modulation concept for planar-waveguide Bragg grating. The periodic structures 50 near the waveguide core are implemented to create periodic perturbation to the effective index of the planar-waveguide 52 and therefore create Bragg gratings.

Figure 5:
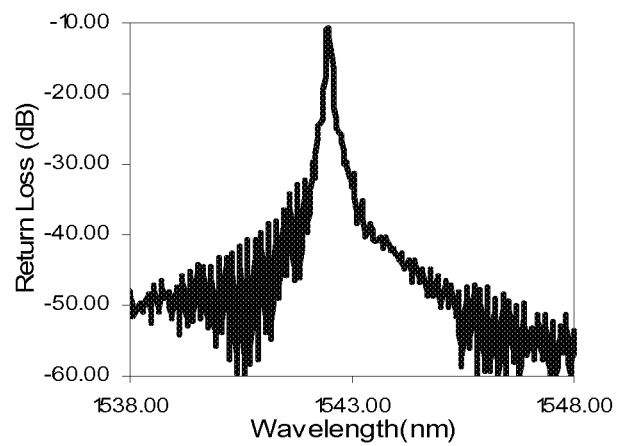
FIG. 5 shows measurement of the reflection spectrum for 5 mm long 3rd order single wavelength curved planar-waveguide Bragg Gratings with 3 mm bend radius.

FIG. 5 is a measurement of the reflection spectrum for 5 mm long 3$^{rd}$ order single wavelength curved planar-waveguide Bragg Gratings with 3 mm bend radius.

Figure 6:
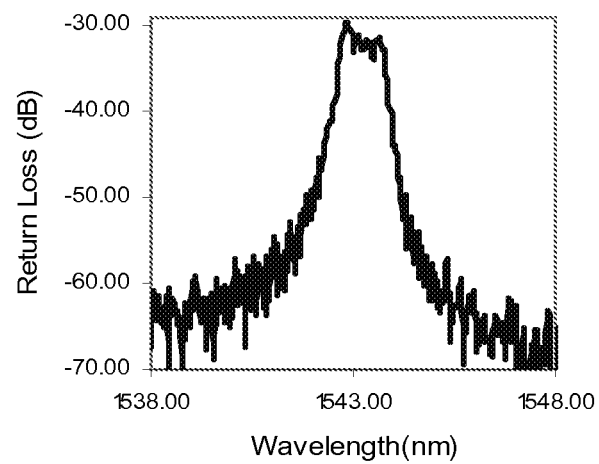
FIG. 6 shows measurement of the reflection spectrum for 10 mm long 3rd order chirped planar-waveguide Bragg grating on a curved waveguide with 5 mm bend radius.

FIG. 6 is a measurement of the reflection spectrum for 10 mm long 3$^{rd}$ order chirped planar-waveguide Bragg grating on a curved waveguide with 5 mm bend radius.

Figure 7:
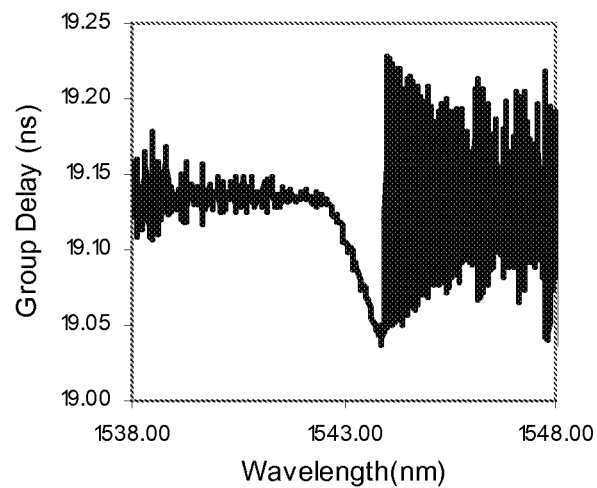
FIG. 7 shows measurement of the group delay for 10 mm long $3^{rd}$ order chirped planar-waveguide Bragg grating on a curved waveguide with 5 mm bend radius.

FIG. 7 is a measurement of the group delay for 10 mm long 3$^{rd}$ order chirped planar-waveguide Bragg grating on a curved waveguide with 5 mm bend radius.

Figure 8:
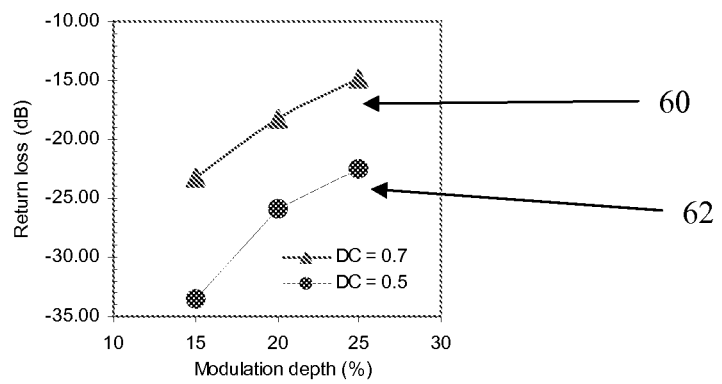
FIG. 8 shows reflectivity measurement data for 70% duty cycle and 50% duty cycle grating designs as a function of modulation depth for 5 mm long $5^{th}$ order gratings.

FIG. 8 is reflectivity measurement data show that 70% duty cycle 60 grating design has >7 dB higher reflectivity than 50% duty cycle 62 gratings for 5 mm long 5$^{th}$ order gratings.

The first design method is to design a long chirped planar-waveguide Bragg grating in an Archimedes' spiral such that a long length of waveguide can fit in a small chip area for single mask photolithography fabrication in single fabrication step. FIG. 1 schematically shows that a 1 m long grating fits in a 1 cm$^2$ chip area. The grating was formed in a curved waveguide and fabricated in low loss silica waveguide platform. The low loss silica waveguide material platform design was 15 µm silica under cladding, 4 µm silica core with 1.5% index contrast, 22 µm silica top cladding, on a silicon substrate. The minimum bend radius of 2 mm results in negligible optical propagation loss due to bending of the waveguide. The single mask photolithography fabrication process minimizes stitching error caused by the need for mechanical translation in conventional approaches, thereby reducing chirp ripple.

The second design method is to use periodic width modulation to form planar-waveguide Bragg gratings on curved waveguide. Conformal mapping method is used to model curved planar-waveguide Bragg gratings. The modulation period is determined by the Bragg condition $\lambda_{Bragg}=2n_{eff}\Lambda$, where $\lambda_{Bragg}$ is the Bragg wavelength, $n_{eff}$ is the effective index of the planar-waveguide, and $\Lambda$ is the modulation period. Therefore, modulation period is $R_{in}\Lambda/(R_{in}+W/2)$ and $R_{out}\Lambda/(R_{out}-W/2)$ for the inner and outer edge of the curve waveguide respectively, where $R_{in}$ and $R_{out}$ are the inner and outer radius, W is the width of the waveguide. Using periodic width modulation simplifies the gratings fabrication process in that the waveguide and the grating are formed in the same fabrication step. This eliminates errors in the chirp profile of the device that could occur due to mask alignment errors in a multi-step fabrication approach.

The third design method is to use rectangular width modulation with duty cycle not equal to 50% to create higher orders Bragg gratings. A perfect sinusoidal width modulated grating gives no higher order reflection. Rectangular width modulation with appropriate duty cycle is used for higher order gratings to maximize Bragg wavelength reflection. Due to the photolithography resolution constraints, and the undercut of waveguide during waveguide etch processing, it is difficult to fabricate a 1$^{st}$ order planar-waveguide Bragg grating in silica waveguide platform with Bragg wavelength in the optical C-band with current technology. Higher orders (3$^{rd}$ & 5$^{th}$) gratings allows larger grating period and larger modulation depth for a desired reflectivity compared with 1$^{st}$ order gratings, thereby relaxing fabrication requirements. FIG. 2 schematically shows a short segment of curved waveguide with periodic rectangular width modulation planar-waveguide Bragg gratings. The coupling coefficient of Bragg gratings is proportional to the absolute value of $(\sin(m\pi D)/(m\pi))$, where m is the grating order and D is the duty cycle. Therefore it is clear that modulation duty cycle is an important design parameter for high order Bragg gratings. The rounding of sharp features inherent in the fabrication process must be considered when choosing the duty cycle. For example, the coupling coefficient should be the same for D=0.5 and 0.7 when m=5. However, due to rounding during the fabrication process, a 50% duty cycle rectangular modulation will result in a more sinusoidal sidewall modulation than a 70% duty cycle rectangular modulation. As such the 50% duty cycle grating will reduce reflectivity as compare to the design reflectivity target to a greater extent than a 70% duty cycle grating (see FIG. 8).

The fourth design method is to use width tapering while keeping the width modulation period constant to introduce chirp in the planar-waveguide Bragg grating. The curve 40 in FIG. 3 shows that the effective index of refraction of a 4 um height, 1.5% index contrast silica waveguide is a function of waveguide width. The curve 44 in FIG. 3 shows that the Bragg wavelength of this silica waveguide is therefore a function of waveguide width. Based on the relationship between effective index and waveguide width, a width tapering profile resulting in a linear chirped grating can be designed. Similarly, alternative tapering profiles can be designed to achieve gratings with alternative chirp characteristics.

This combination of four design methods comprise a novel approach for fabricating long, low loss, spiral chirped planar-waveguide Bragg gratings with tailored dispersion properties using standard low cost semiconductor photolithography fabrication techniques.

An advantage of this invention is combining all the four design methods described above such that standard low cost single mask photolithography fabrication method can be used to fabricate long chirped planar-waveguide Bragg gratings. Being able to utilize photolithography method allows fabrication of long gratings to achieve large dispersion, and provides the flexibility for custom design for different applications. The single mask photolithography fabrication process also minimizes stitching error caused by mechanical translation required in traditional grating fabrication approaches, thereby reducing chirp ripple—another very important parameter for long chirped Bragg gratings.

Among the features of the present invention are fabrication of Bragg gratings on curved waveguide combinations of four novel design methods to fabricate long chirped planar-waveguide Bragg gratings with large dispersion and low stitching error.

Instead of using periodic width modulation to create Bragg gratings, one alternative method is to use periodic cladding modulation. FIG. 4 shows a short segment of periodic cladding modulation Bragg grating, where periodic pillars are fabricated in the cladding of the waveguide. The cladding modulation approach has the advantage of achieving lower optical propagation loss gratings as compared to the width modulation approach.

Instead of using photolithography, another alternative fabrication method is to use direct e-beam for fabrication of planar-waveguide Bragg gratings.

Instead of using low loss silica waveguide for the planar-waveguide Bragg gratings, other material platform (e.g., silicon, silicon nitride) might be used for different application requirements.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

From the above description, it is apparent that various techniques may be used for implementing the concepts of the present invention without departing from its scope. The described embodiments are to be considered in all respects as illustrative and not restrictive.

For example, higher order Gratings (both $3^{rd}$ and $5^{th}$ order) were realized in curved waveguide with both sidewall and cladding modulation method (see FIG. 5). And, chirped planar-waveguide Bragg gratings were realized with width tapering method (see FIGS. 6, 7, and 8).

It should therefore be understood that the present invention is not limited to the particular embodiments described herein, but is capable of many embodiments without departing from the scope of the claims.

What is claimed is:

1. A method for forming planar-waveguide Bragg grating in a curved waveguide comprising:
    forming a long chirped planar-waveguide Bragg grating in an Archimedes' spiral such that a long length of the waveguide can fit in a small chip area for single mask photolithography fabrication where the grating is formed in the curved waveguide;
    using periodic width modulation to form the planar-waveguide Bragg grating on the curved with modulation periods equal to $R_{in}\Lambda/(R_{in}+W/2)$ and $R_{out}\Lambda/(R_{out}-W/2)$ for the inner and outer edge of the curve waveguide, where $R_{in}$ and $R_{out}$ are the inner and outer radius, $\Lambda$ is modulation period for Bragg condition, and W is the width of the waveguide and where the formation of the periodic width modulation occurs during the etching of the waveguide core;
    using rectangular width modulation to create Bragg gratings with a higher order than $1^{st}$ order to allow a larger grating period and larger modulation depth, and therefore relax fabrication requirements;
    using waveguide width tapering while keeping the width modulation period constant to introduce chirp to the planar-waveguide Bragg grating where the index of refraction is a function of waveguide width, by applying a specific width tapering such that desired arbitrary chirp profile can be created for the planar-waveguide Bragg grating.

2. The method of claim 1 wherein the higher order is $3^{rd}$ order.

3. The method of claim 1 wherein the higher order is $5^{th}$ order.

4. The method of claim 1 wherein the grating is fabricated in low loss silica waveguide platform.

5. A method for forming planar-waveguide Bragg grating in a curved waveguide comprising:
    forming a long chirped planar-waveguide Bragg grating in an Archimedes' spiral such that a long length of the waveguide can fit in a small chip area for single mask photolithography fabrication where the grating is formed in the curved waveguide and fabricated in low loss waveguide platform;
    using periodic width modulation or periodic cladding modulation to form the planar-waveguide Bragg grating on the curved waveguide where the formation of the periodic width modulation or periodic cladding modulation occurs during the same fabrication step as the etching of the waveguide core and where the modulation period is $R_{in}\Lambda/(R_{in}+W/2)$ and $R_{out}\Lambda/(R_{out}-W/2)$ for the inner and outer edge of the curve waveguide, where $R_{in}$ and $R_{out}$ are the inner and outer radius, $\Lambda$ is modulation period for Bragg condition, and W is the width of the waveguide;
    using rectangular width modulation to create higher order Bragg gratings instead of $1^{st}$ order sinusoidal width modulation where higher order (such as 3rd & $5^{th}$) gratings allows larger grating period and larger modulation depth, and therefore relaxed fabrication requirements;
    using rectangular width modulation with duty cycle not equal to 50% to optimize the grating reflectivity;
    using waveguide width tapering while keeping the width modulation period constant to introduce chirp to the planar-waveguide Bragg grating where the index of refraction is a function of waveguide width;

using a specific width tapering such that a desired arbitrary chirp profile is realized for the planar-waveguide Bragg grating; and using a specific width tapering such that a linear chirp is realized for the planar-waveguide Bragg grating.

6. A planar-waveguide Bragg grating in a curved waveguide comprising:

a long chirp planar-waveguide Bragg grating formed in an Archimedes' spiral such that a long length of the waveguide can fit in a small chip area for single mask photolithography fabrication where the grating is formed in the curved waveguide and fabricated in low loss silica waveguide platform;

the planar-waveguide Bragg gratings formed using periodic width modulation with modulation periods equal to $R_{in}\Lambda/(R_{in}+W/2)$ and $R_{out}\Lambda/(R_{out}-W/2)$ for the inner and outer edge of the curve waveguide, where $R_{in}$ and $R_{out}$ are the inner and outer radius, $\Lambda$ is modulation period for Bragg condition, and W is the width of the waveguide and where the formation of the periodic width modulation occurs during the etching of the waveguide core;

the Bragg grating having higher order Bragg gratings created using rectangular width modulation where the higher order gratings allows larger grating period and larger modulation depth, and therefore relax fabrication requirements;

the Bragg grating formed using width tapering while keeping the width modulation period constant to introduce chirp to the planar-waveguide Bragg grating where the index of refraction is a function of waveguide width, by applying a specific width tapering such that desired arbitrary chirp profile can be created for the planar-waveguide Bragg grating.

* * * * *